«12» United States Patent
Zambelli

(10) Patent No.: US 10,870,498 B2
(45) Date of Patent: Dec. 22, 2020

(54) SYSTEM, METHOD AND STATION FOR LANDING OF A DRONE

(71) Applicant: Zambelli Imagineering Pty Ltd, New South Wales (AU)

(72) Inventor: Kate Zambelli, Hunters Hill (AU)

(73) Assignee: Zambelli Imagineering Pty Ltd, New South Wales (AU)

(*) Notice: Subject to any disclaimer, the term of this patent is extended or adjusted under 35 U.S.C. 154(b) by 0 days.

(21) Appl. No.: 16/484,202

(22) PCT Filed: Apr. 20, 2018

(86) PCT No.: PCT/AU2018/050362
§ 371 (c)(1),
(2) Date: Aug. 7, 2019

(87) PCT Pub. No.: WO2019/071293
PCT Pub. Date: Apr. 18, 2019

(65) Prior Publication Data
US 2019/0367185 A1   Dec. 5, 2019

(30) Foreign Application Priority Data

Oct. 12, 2017 (AU) ................................ 2017904114

(51) Int. Cl.
*B64F 1/36* (2017.01)
*B64F 1/00* (2006.01)
(Continued)

(52) U.S. Cl.
CPC ................ *B64F 1/36* (2013.01); *B64C 39/00* (2013.01); *B64C 39/024* (2013.01); *B64F 1/00* (2013.01);
(Continued)

(58) Field of Classification Search
CPC .................................. B64F 1/22; B64F 1/222
(Continued)

(56) References Cited

U.S. PATENT DOCUMENTS 4,974,795 A    12/1990  Christol
9,701,425 B2 *  7/2017  Lee ...................... G08G 5/0013
(Continued)

FOREIGN PATENT DOCUMENTS

DE        19934210 A1 *  2/2001  ................ B64F 1/31
WO     2017075907       5/2017
WO     2017106721       6/2017

OTHER PUBLICATIONS

Translation of DE 19934210 A1 (Year: 2001).*
International Search Report filed in PCT/AU2018/050362 dated Jul. 12, 2018.

*Primary Examiner* — Richard R. Green
*Assistant Examiner* — Steven J Shur
(74) *Attorney, Agent, or Firm* — Rankin, Hill & Clark LLP

(57) ABSTRACT

Systems for landing and handling of a drone may include a platform on which the drone is supportable in a landed state; a space to receive the platform and drone in the landed state, a first closable barrier arranged between the drone in the landed state and an external environment; a second closable barrier arranged between the drone in the landed state and a passenger zone; and a control arrangement configured to operate the platform, the first closable barrier and the second closable barrier between: a first condition, in which the first closable barrier is in an open condition, the second closable barrier is in a closed condition and the drone is landable on the platform, and a second condition, in which the platform and drone in the landed state are receivable by the space, the
(Continued)

first closable barrier is movable to a closed condition, and the second closable barrier is moveable to an open condition.

20 Claims, 12 Drawing Sheets

(51) Int. Cl.
*B64C 39/00* (2006.01)
*E01F 3/00* (2006.01)
*E04H 6/44* (2006.01)
*B64C 39/02* (2006.01)

(52) U.S. Cl.
CPC ............... *B64F 1/005* (2013.01); *E01F 3/00* (2013.01); *E04H 6/44* (2013.01); *B64C 2201/027* (2013.01); *B64C 2201/18* (2013.01)

(58) Field of Classification Search
USPC ..................................................... 244/114 R
See application file for complete search history.

(56) References Cited

U.S. PATENT DOCUMENTS

| | | | |
|---|---|---|---|
| 10,124,912 B2* | 11/2018 | Walsh | ................. B64F 1/32 |
| 2014/0252168 A1 | 9/2014 | Brody | |
| 2017/0197710 A1 | 7/2017 | Ma | |
| 2019/0217971 A1* | 7/2019 | Comerford | .......... A47G 29/141 |

* cited by examiner

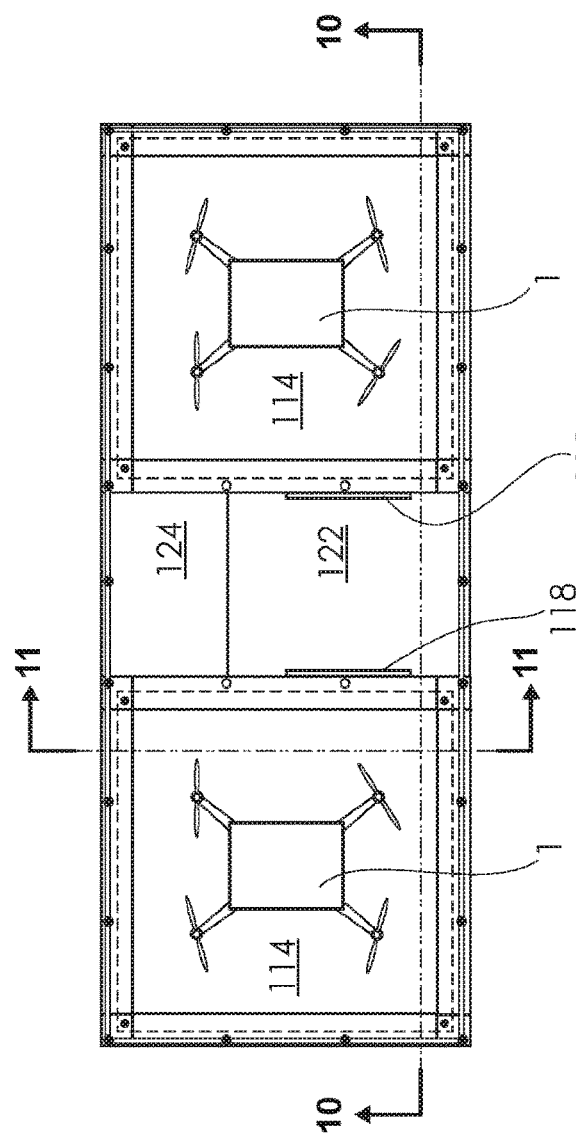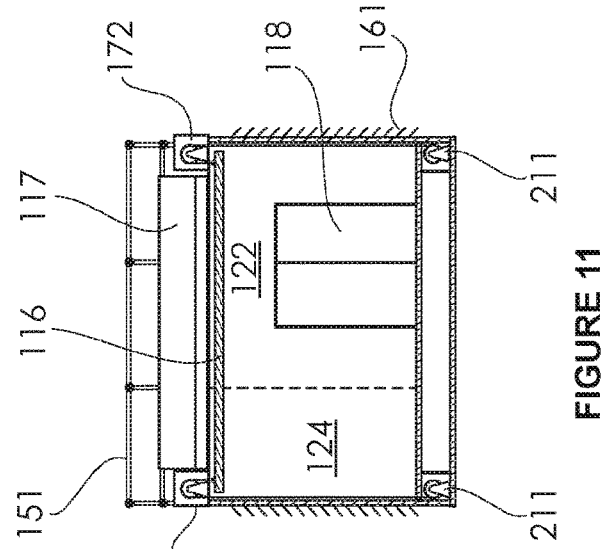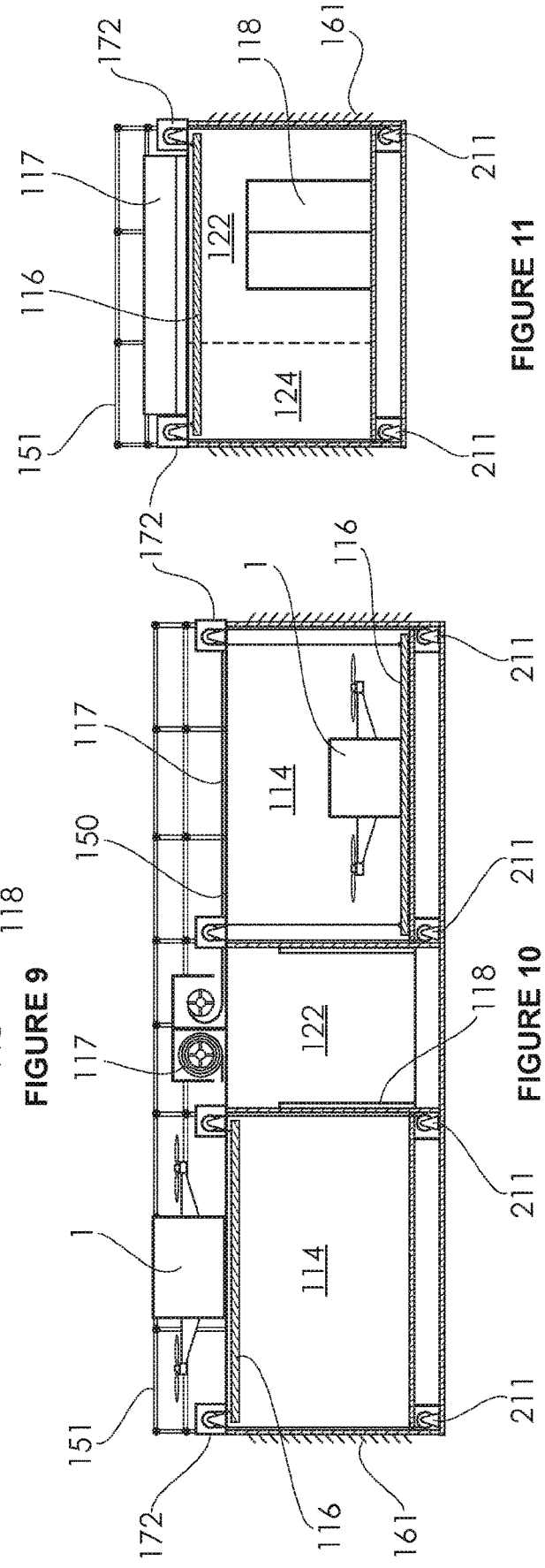

SYSTEM, METHOD AND STATION FOR LANDING OF A DRONE

RELATED APPLICATIONS

This application claims priority from Australian provisional patent application no. 2017904114 filed on 12 Oct. 2017, the contents of which are incorporated by reference.

TECHNICAL FIELD

The invention relates to a system, method and station for the landing and handling of a drone such as a passenger drone or the like. The invention also relates to a portable landing station or building for the landing and handling of a drone.

BACKGROUND

Autonomous and semi-autonomous aerial vehicles, commonly known as drones, may be used to carry passengers and freight. Such drones are currently being trialled for personal and freight transport in metropolitan or urban areas. Such passenger and freight drones typically have a passenger or freight pod and multiple propellers each carried by respective arms that extend outwardly of the pod.

The use of such drones in metropolitan or urban areas presents challenges such as providing designated areas for the take-off, landing, handling of the drones and passenger and/or freight logistics. For example, during take-off and landing the propellers present a significant hazard.

The invention disclosed herein seeks to overcome one or more of the above-identified problems or at least provide a useful alternative.

SUMMARY

In accordance with a first broad aspect there is provided, a system for landing a drone, the system including: a moveable platform on which the drone is supportable in a landed state; a space dimensioned to receive the platform and drone in the landed state, a first closable barrier arranged between the drone in the landed state and an external environment; a second closable barrier arranged between the drone in the landed state and a passenger zone adjacent the space; and a control arrangement configured to selectively operate the platform, the first closable barrier and the second closable barrier between: a first condition, in which the first closable barrier is in an open condition, the second closable barrier is in a closed condition and the drone is landable on the platform, and a second condition, in which the platform and drone in the landed state are receivable by the space, the first closable barrier is movable to a closed condition, and the second closable barrier is moveable to an open condition.

In an aspect, the control arrangement is adapted to determine an operating state of the drone in the second condition being in one of a safe and a non-safe state, and inhibit operation of the second closable barrier in the non-safe state.

In another aspect, the control arrangement is adapted to determine an operating state of the drone in the first condition being in one of a safe and a non-safe state, and inhibit movement of the platform to within the space in a non-safe state.

In yet another aspect, the control arrangement includes at least one of a sensor and a communication link with the drone to determine the operating state of the drone In yet another aspect, the platform includes at least one sensor adapted to provide information to enable the control arrangement to determine the operating state of the drone.

In yet another aspect, the safe state includes at least one of the drone body and rotors of the drone ceasing movement.

In yet another aspect, the control arrangement is adapted identify an approaching drone, and move the platform, the first closable barrier and the second closable barrier to the first condition.

In yet another aspect, in the second condition, the control arrangement is configured to move the first closable barrier to the closed condition.

In yet another aspect, the system includes: a first opening between the external environment and the space, and wherein the first closable barrier is located at the first opening; and a second opening between the space and the passenger zone, and wherein the second closable barrier is located at the second opening.

In yet another aspect, the first and second closable barriers are arranged to substantially cover the respective first and second openings of the space in respective closed conditions.

In yet another aspect, the control arrangement includes actuators coupled to each of the first and second closable barriers.

In yet another aspect, the system includes pluralities of spaces, first and second closable barriers and platforms, and wherein the control arrangement is configured to coordinate the movement of the pluralities of the first and second closable barriers and the platforms so as to allow operation of pluralities of drones to each of the pluralities of the spaces.

In yet another aspect, the platform is adapted to carry the drone into the space when being moved between the first condition and the second condition.

In yet another aspect, the platform is adapted to convey the drone into the space when being moved between the first condition and the second condition.

In yet another aspect, the platform is adapted to extend and retract relative to the space when being moved between the first condition and the second condition.

In yet another aspect, the platform is adapted to move upwardly and downwardly relative to the space when being moved between the first condition and the second condition.

In yet another aspect, the passenger zone is at least partially enclosed.

In yet another aspect, the platform at least one of carries and provides the first closable barrier.

In yet another aspect, the drone is a passenger or freight drone.

In accordance with second first broad aspect there is provided, a structure including a system as defined above and herein.

In accordance with a third broad aspect there is provided, a building including a system as defined above and herein.

In accordance with a fourth broad aspect there is provided, a portable landing station for a drone fitted with a system as defined above and herein.

In accordance with a fifth broad aspect there is provided, a landing station for a drone, the station including: a space dimensioned to receive the drone; a landing platform movably receivable by the space on which the drone is supportable; a first closable barrier between an external environment and the space; a second closable barrier between the space and a passenger zone adjacent the space; and a control system configured to selectively operate the platform, the first closable barrier and the second closable barrier between a first condition, in which the first closable barrier is in an open condition, the second closable barrier is in a closed condition and the drone is landable on the platform, and a second condition, in which the platform and the landed drone a receivable by the space, the first closable barrier is movable to a closed condition, and the second closable barrier is moveable to an open condition.

In an aspect, the space is located below the platform in the first condition and the platform is lowerable into the space in the second condition.

In another aspect, the space is located horizontally adjacent the platform in the first condition and the platform is horizontally moveable into the space in the second condition.

In yet another aspect, the control arrangement is adapted to determine an operating state of the drone in the second condition being in one of a safe and a non-safe state, and inhibit operation of the second closable barrier in the non-safe state.

In yet another aspect, the control arrangement is adapted to determine an operating state of the drone in the first condition being in one of a safe and a non-safe state, and inhibit movement of the platform to within the space in a non-safe state.

In yet another aspect, the control arrangement includes at least one of a sensor and a communication link with the drone to determine the operating state of drone.

In yet another aspect, the platform includes at least one sensor adapted to provide information to enable the control arrangement to determine the operating state of the drone.

In accordance with a sixth broad aspect there is provided, a building including a plurality of landing zones for a drone, each of the landing zones including: a space dimensioned to receive the drone; an associated landing platform movably receivable by the space on which the drone is supportable; an associated first closable barrier into the space dimensioned to receive the drone and platform; an associated second closable barrier into the space dimensioned to allow the movement of a person between the drone and a passenger zone external to the space; and a control system configured to selectively operate and coordinate the platform, first closable barrier and second closable barrier associated with each of the landing zones between a first condition, in which the first closable barrier is in an open condition, the second closable barrier is in a closed condition and the drone is landable on the platform, and a second condition, in which the platform and landed drone a receivable by the space, the first closable barrier is movable to a closed condition, and the second closable barrier is moveable to an open condition.

In accordance with a seventh broad aspect there is provided, a method for the landing and handling of a drone, the method including: in a first condition, operating a first closable barrier to an open condition to allow receiving of the drone within a space, operating a second closable barrier to a closed condition to inhibit a person moving into the space, and operating a platform of the drone handling system to be positioned to support the landing drone, and in a second condition, operating the platform to move the landed drone within the space, operating the first closable barrier to a closed condition, and operating the second closable barrier to an open condition.

In an aspect, the control arrangement is adapted to determine an operating state of the drone in the second condition being in one of a safe and a non-safe state, and inhibit operation of the second closable barrier in the non-safe state.

In another aspect, the control arrangement is adapted to determine an operating state of the drone in the first condition being in one of a safe and a non-safe state, and inhibit movement of the platform to within the space in a non-safe state.

In yet another aspect, the control arrangement includes at least one of a sensor and a communication link with the drone to determine the operating state of the drone.

In accordance with a seventh broad aspect there is provided, a system for landing a drone, the system including: a motive structure on which the drone is supportable in a landed state; a space dimensioned to receive the drone in the landed state, a first closable barrier arranged between the drone in the landed state and an external environment; a second closable barrier arranged between the drone in the landed state and a passenger zone; and a control arrangement configured to selectively operate the motive structure, the first closable barrier and the second closable barrier between a first condition, in which the first closable barrier is in an open condition, the second closable barrier is in a closed condition and the drone is landable on the motive structure, and a second condition, in which the motive structure moves the drone in the landed state so as to be receivable by the space, the first closable barrier is movable to a closed condition, and the second closable barrier is moveable to an open condition.

In accordance with a eighth broad aspect there is provided, a system for landing a drone, the system including: a moveable landing platform; a space dimensioned to receive the drone and platform, a first closable barrier arranged to be selectively moveable between a first open and a first closed condition to inhibit the drone entering the space; a second closable barrier arranged to be selectively movable between a second open and a second closed condition to inhibit a person entering the space; and a control arrangement configured to selectively operate the platform, the first closable barrier and the second closable barrier between a first state, in which the first closable barrier is in the first open condition, the second closable barrier is in the second closed condition and the drone is landable on the platform, and a second state, in which the platform and landed drone a receivable by the space, the first closable barrier is movable to the first closed condition, and the second closable barrier is moveable to the second open condition.

In an aspect, at least one of the first and second closable barriers are at least one of coupled to and provided by the platform.

In accordance with a ninth broad aspect there is provided, a system for landing a drone, the system including: a moveable landing platform; a space arranged to selectively receive the drone, the platform and a person; and a control arrangement configured to selectively configure the space between a first condition, in which the drone and platform are receivable by the space and the person is inhibited from entering the space, and a second condition in which the person is able to enter the space to access the drone.

In accordance with a tenth broad aspect there is provided, a system for landing a drone, the system including: a motive structure adapted to support the drone in a landed state; a space arranged to selectively receive the drone in the landed state; and a control arrangement configured to selectively configure the space between a first condition, in which the motive structure moves the drone so as to be receivable by the space and a person is inhibited from entering the space, and a second condition in which the person is able to enter the space to access the drone.

In accordance with an eleventh broad aspect there is provided, a system for landing a drone, the system including: a moveable landing platform; a space dimensioned to receive the drone and platform, a first opening to the space dimensioned to receive the drone and landing platform; a second opening to the space dimensioned to allow the movement of a person between the drone and an environment external to the space; a first closable barrier arranged to at least partially cover the first opening; a second closable barrier arranged to at least partially cover the second opening; and a control arrangement configured to selectively operate the platform, the first closable barrier and the second closable barrier between a first condition, in which the first closable barrier is in an open condition, the second closable barrier is in a closed condition and the drone is landable on the platform, and a second condition, in which the platform and landed drone a receivable by the space, the first closable barrier is movable to a closed condition, and the second closable barrier is moveable to an open condition.

BRIEF DESCRIPTION OF THE FIGURES

The invention is described, by way of non-limiting example only, by reference to the accompanying figures, in which;

FIG. 9 is a top view illustrating the portable building;

FIG. 10 is a front sectional view illustrating the portable building;

FIG. 11 is an end sectional view illustrating the portable building;

DETAILED DESCRIPTION

Figure 1:
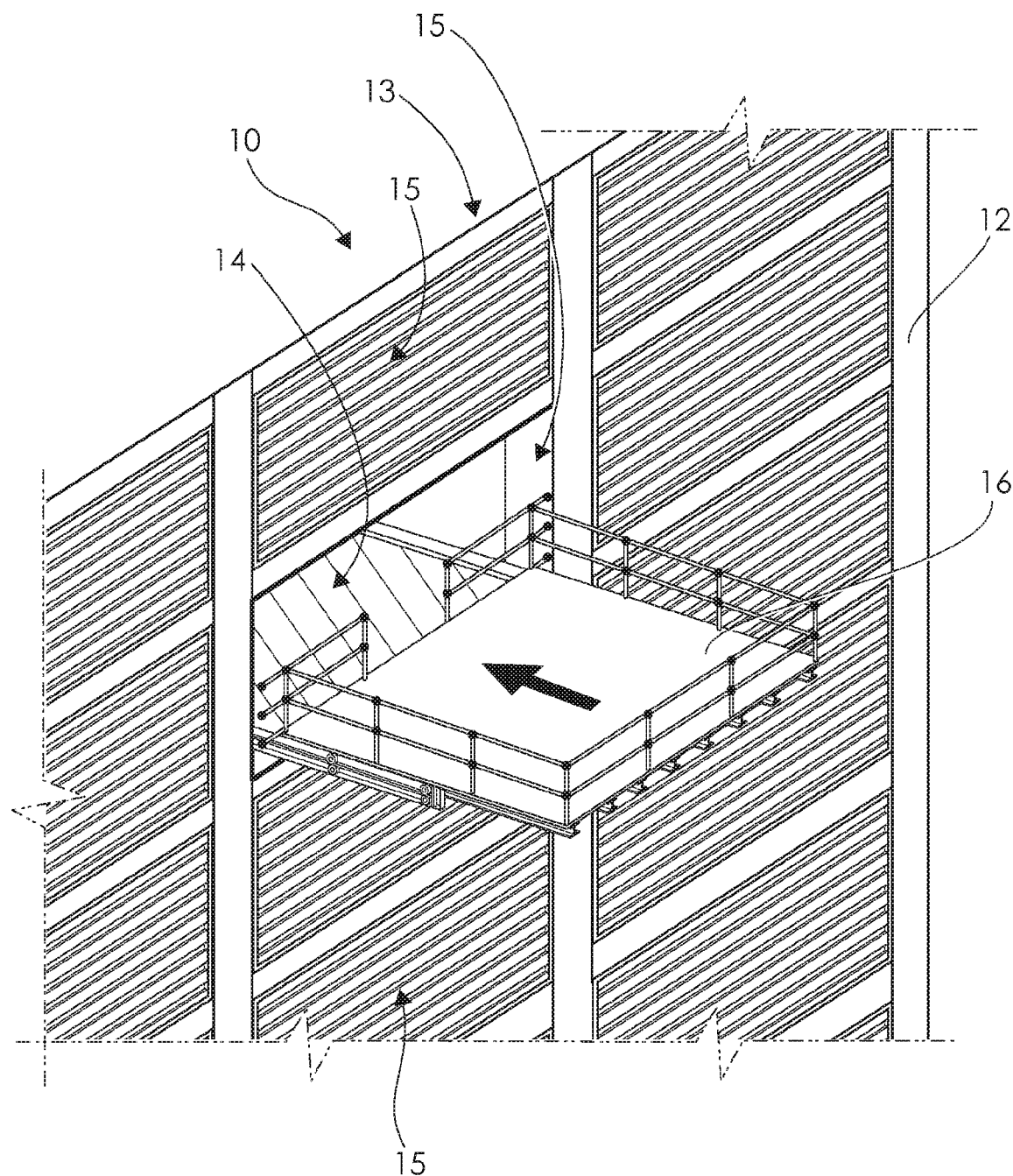
FIG. 1 is a perspective front view of a first example of a system for landing and handling of drones showing a platform extending from a building leading to a closable barrier to receive a landing drone.
Figure 2:
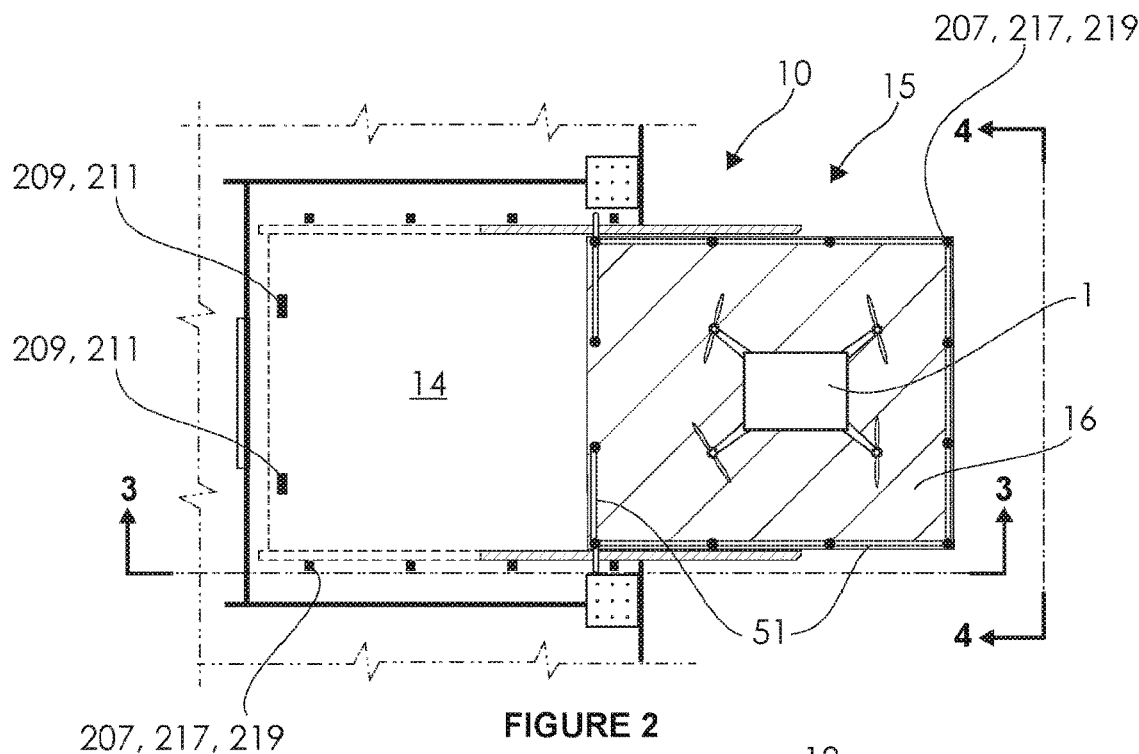
FIG. 2 is a top view illustrating the system with the platform thereof in a first outward landing condition with one of the closable barriers in an open condition.
Figure 3:
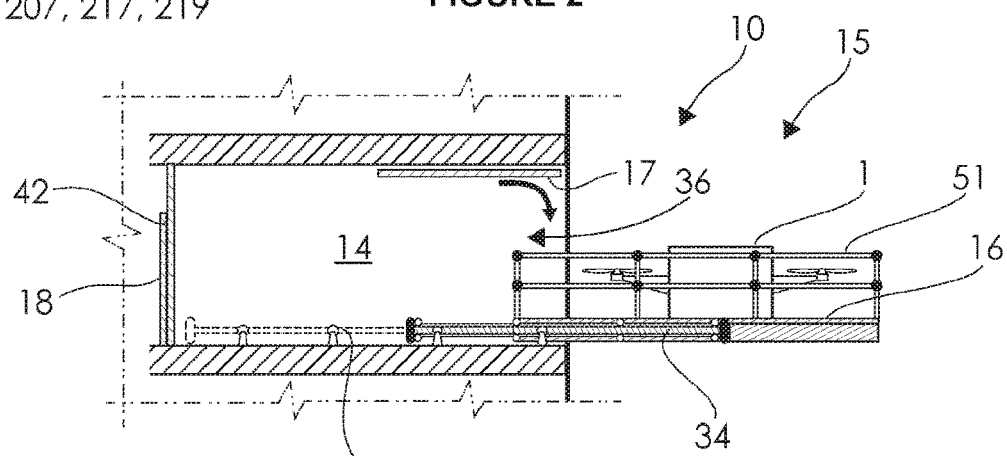
FIG. 3 is a side view illustrating the system with the platform thereof in the outward landing condition.
Figure 4:
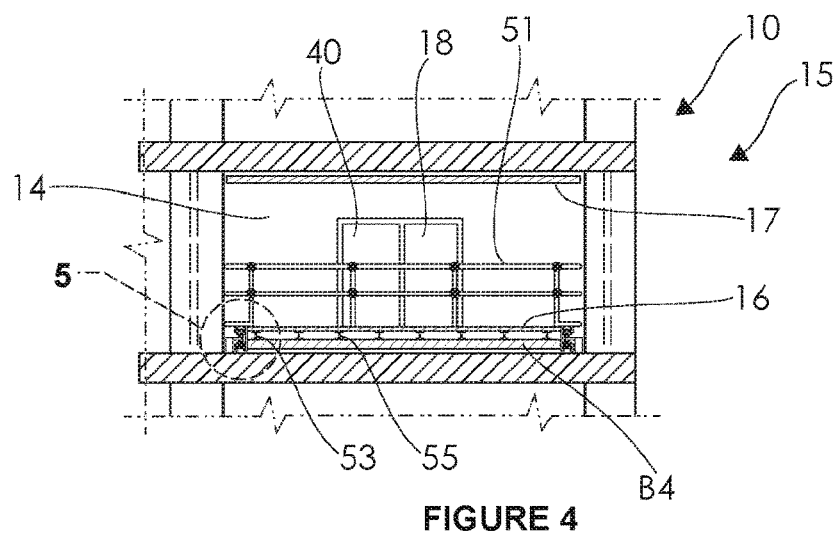
FIG. 4 is a front view illustrating the system with the platform thereof in an inward landed condition.
Figure 5:
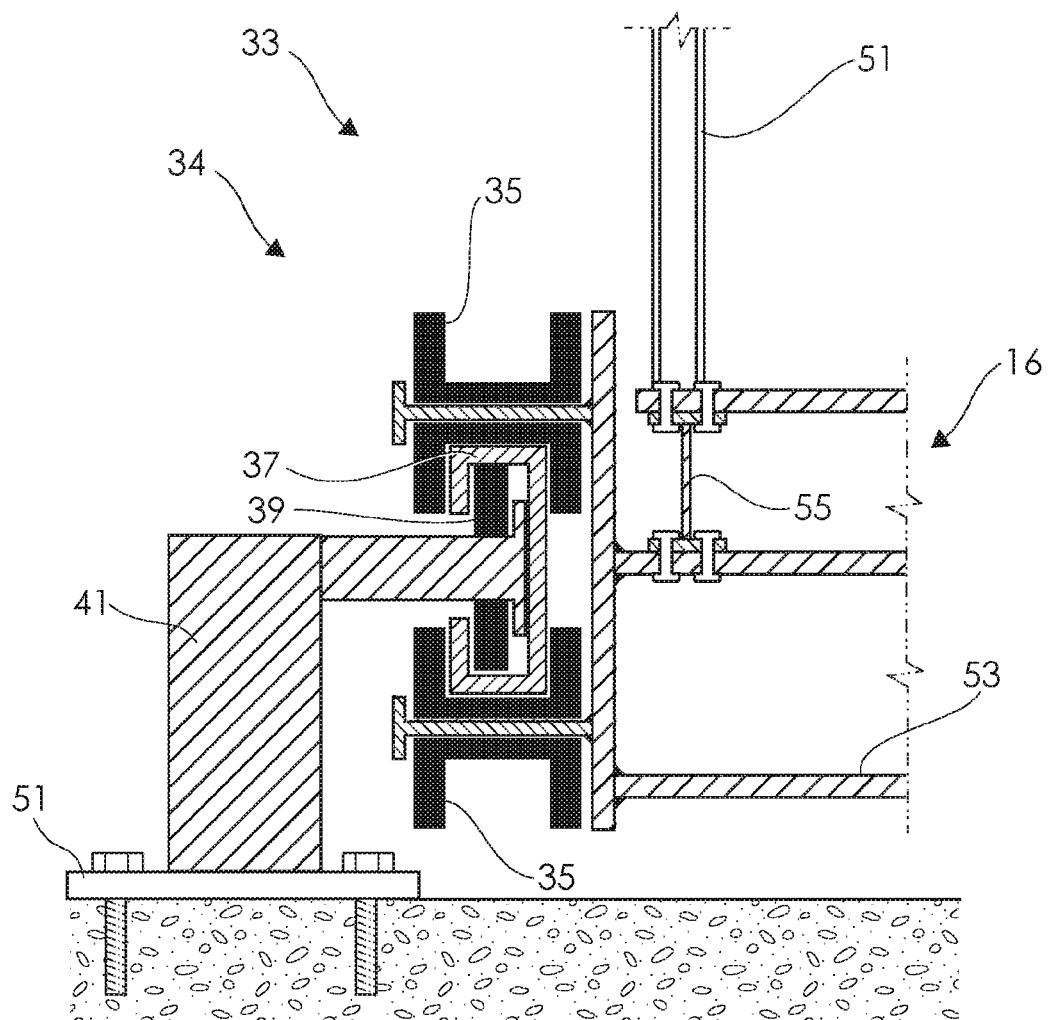
FIG. 5 is a front sectional view illustrating a rail arrangement of the extendable and retractable landing platform.
Figure 6:
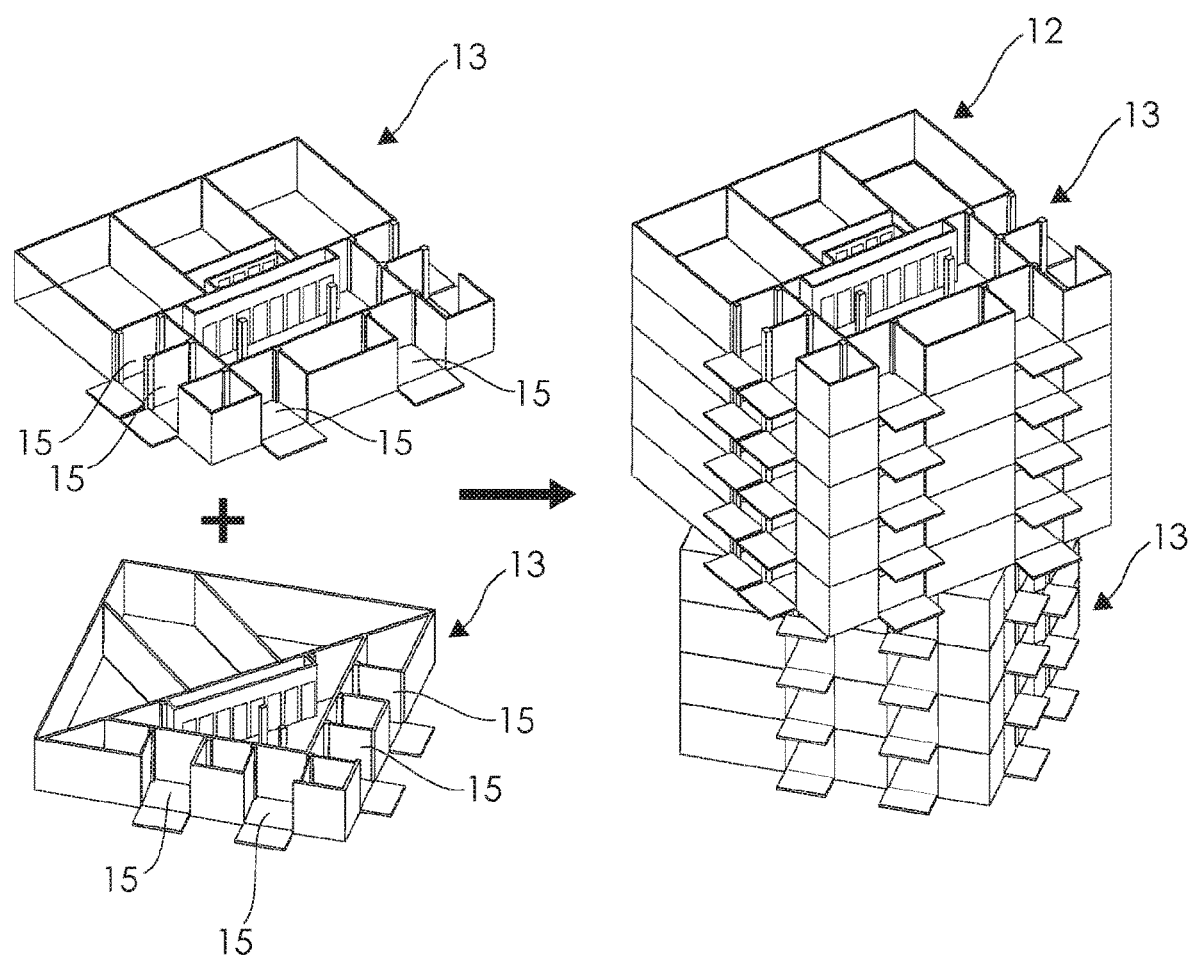
FIG. 6 is a perspective view illustrating configurations of a building to which the system may be fitted.
Figure 7A:
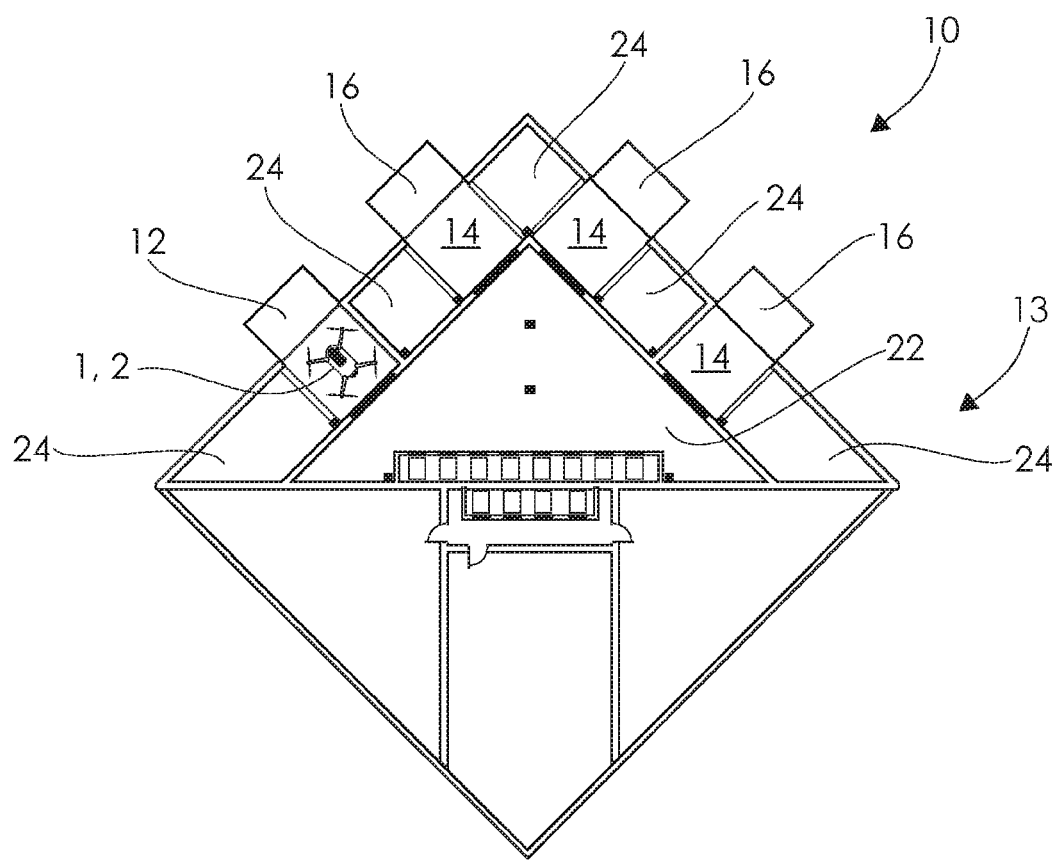
FIGS. 7A and 7B are top views illustrating configurations or layouts of the drone landing and handling arrangement when fitted to or formed as part of the building.
Figure 7B:
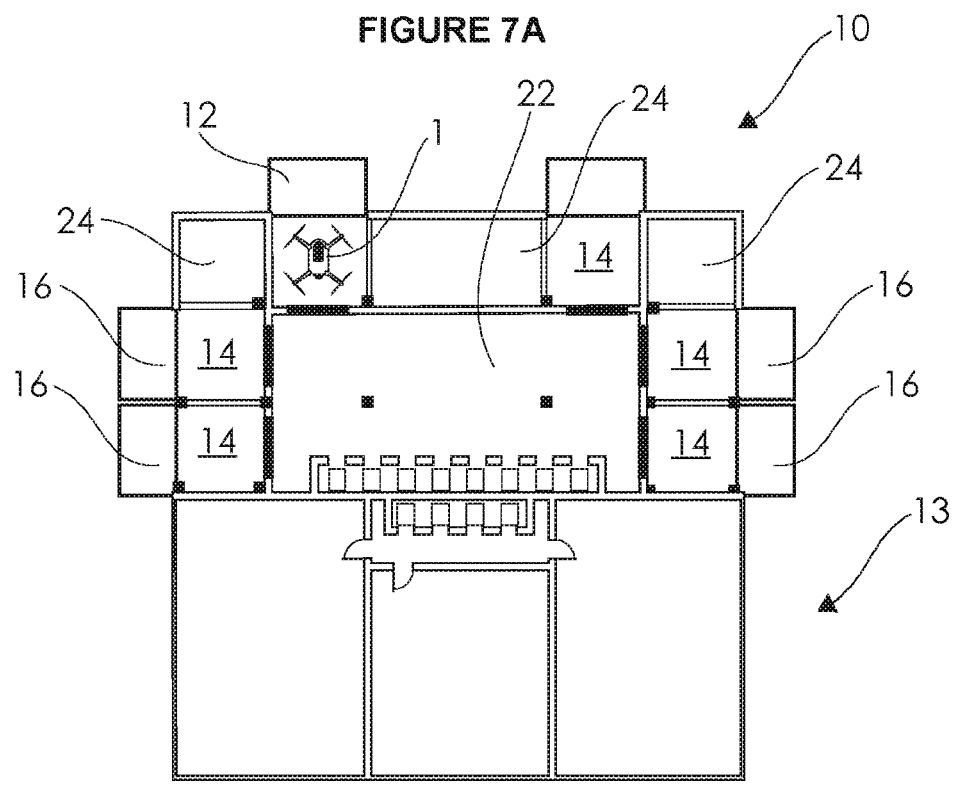
Figure 8:
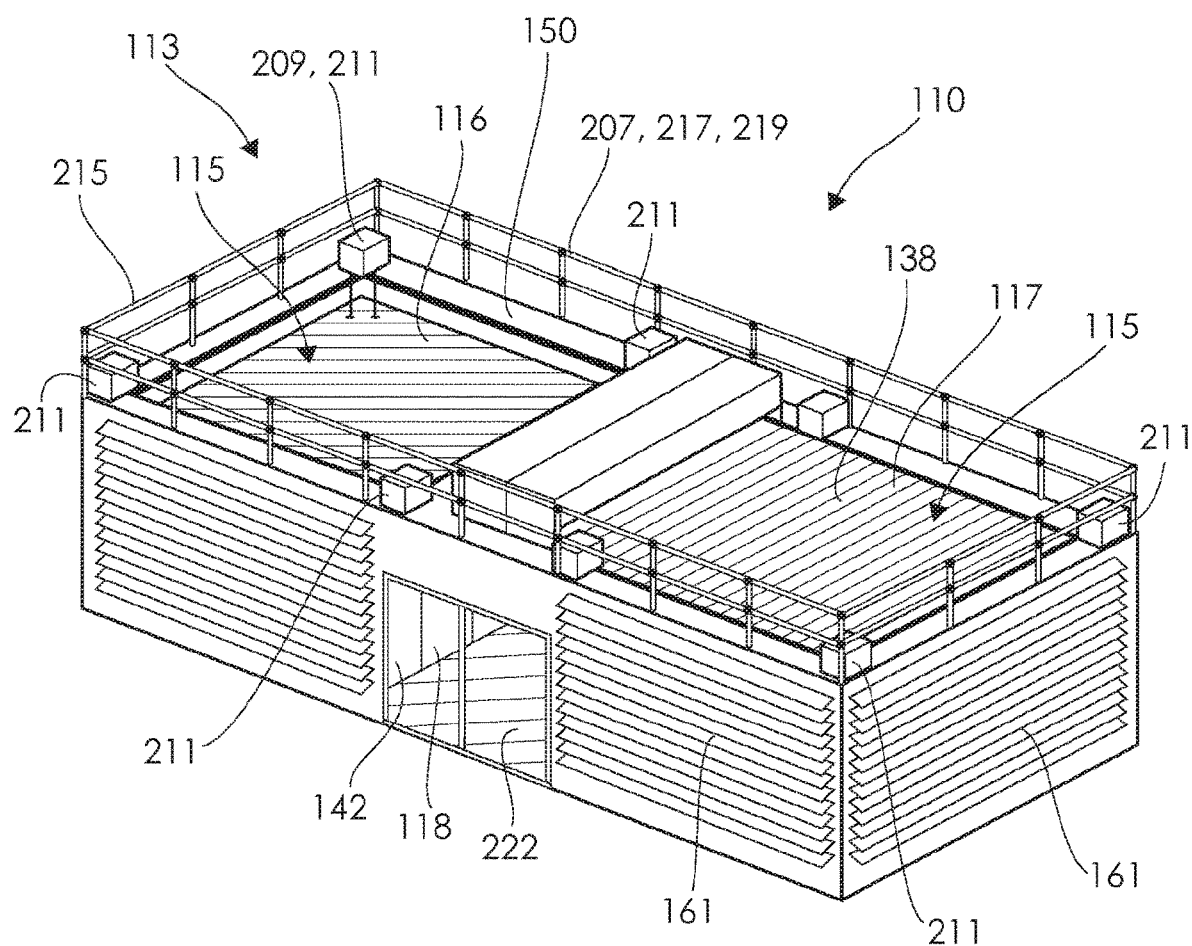
FIG. 8 is a perspective view illustrating a second example of a system for landing and handling of drones being fittable to a portable building.
Figure 12:
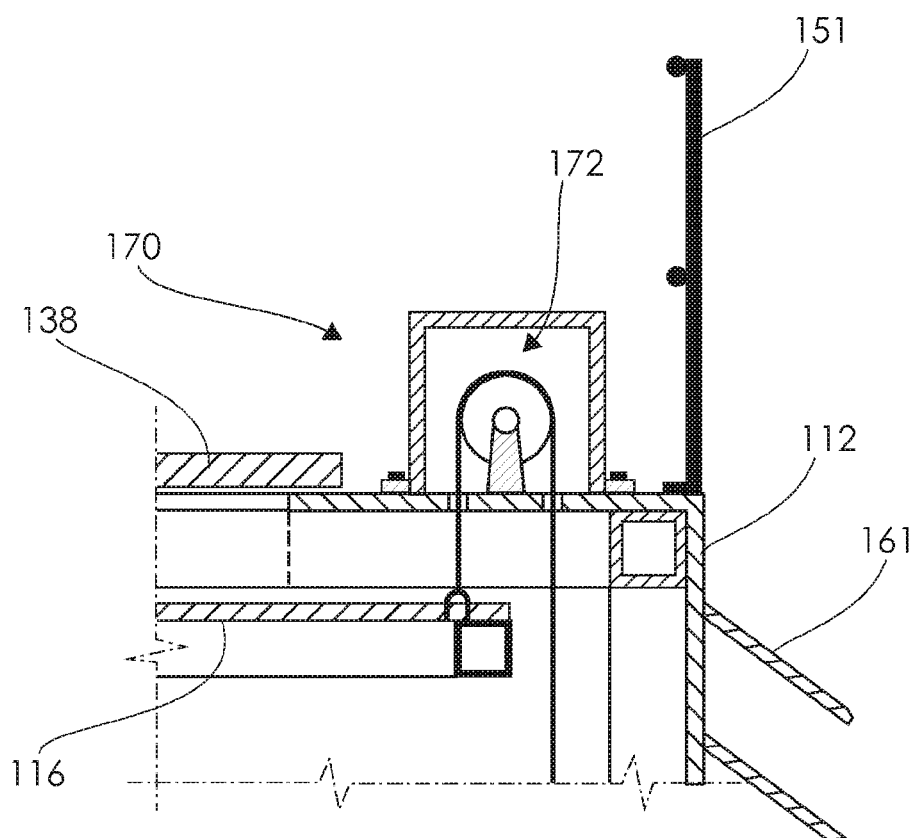
FIG. 12 is a side detail sectional view illustrating the arrangement between the pulley system, the platform and the retractable roof.
Figure 13:
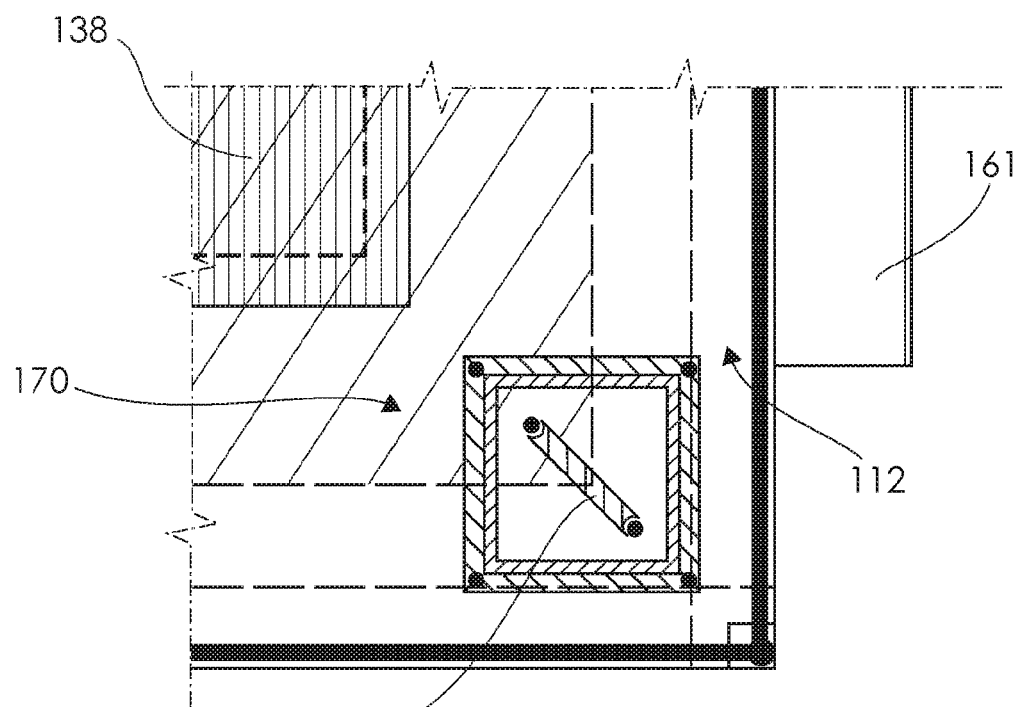
FIG. 13 is a top detail sectional view illustrating the arrangement between the pulley system, the platform and the retractable roof.

Referring to FIGS. 1 to 7B and FIGS. 8 to 13 there are shown two examples of a system 10, 110, respectively, for the landing and handling of drones 1 (also known as autonomous flying vehicles or the like). The first example of the system 10 is fittable to new or existing buildings or structures 12, and the second example of the system 110 is fittable to or provided as part of a portable building or structure 112. The drones 1 may be freight or passenger drones 1, although the systems 10, 110 are preferably adapted to handle the interaction of people and drones 1. It is noted that the term drone used herein includes all and any forms of autonomous or semi-autonomous flying machines being fully autonomous or being piloted.

Figure 14:
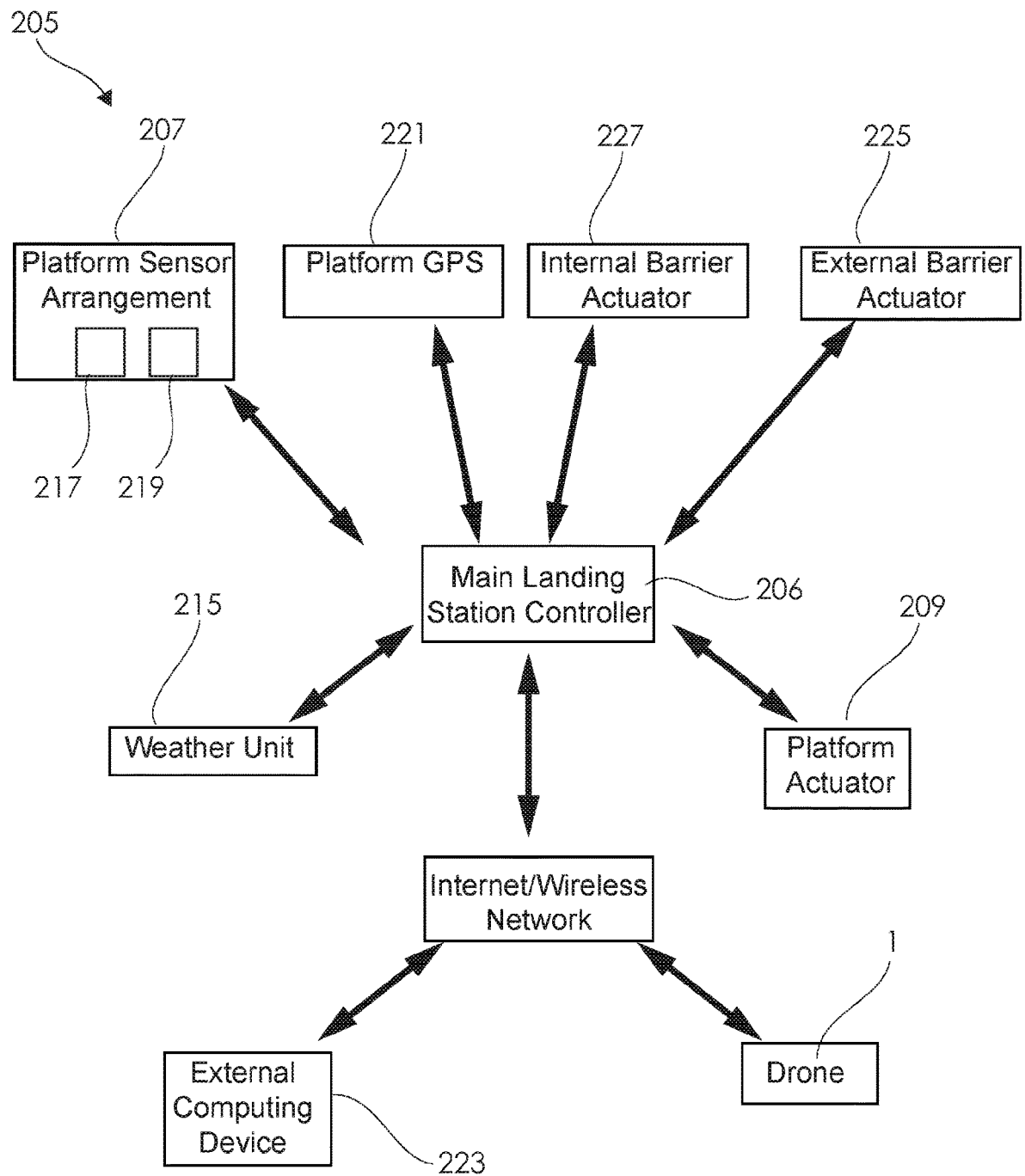
FIG. 14 is a simplified functional block diagram of a control system or arrangement of the system.
Figure 15:
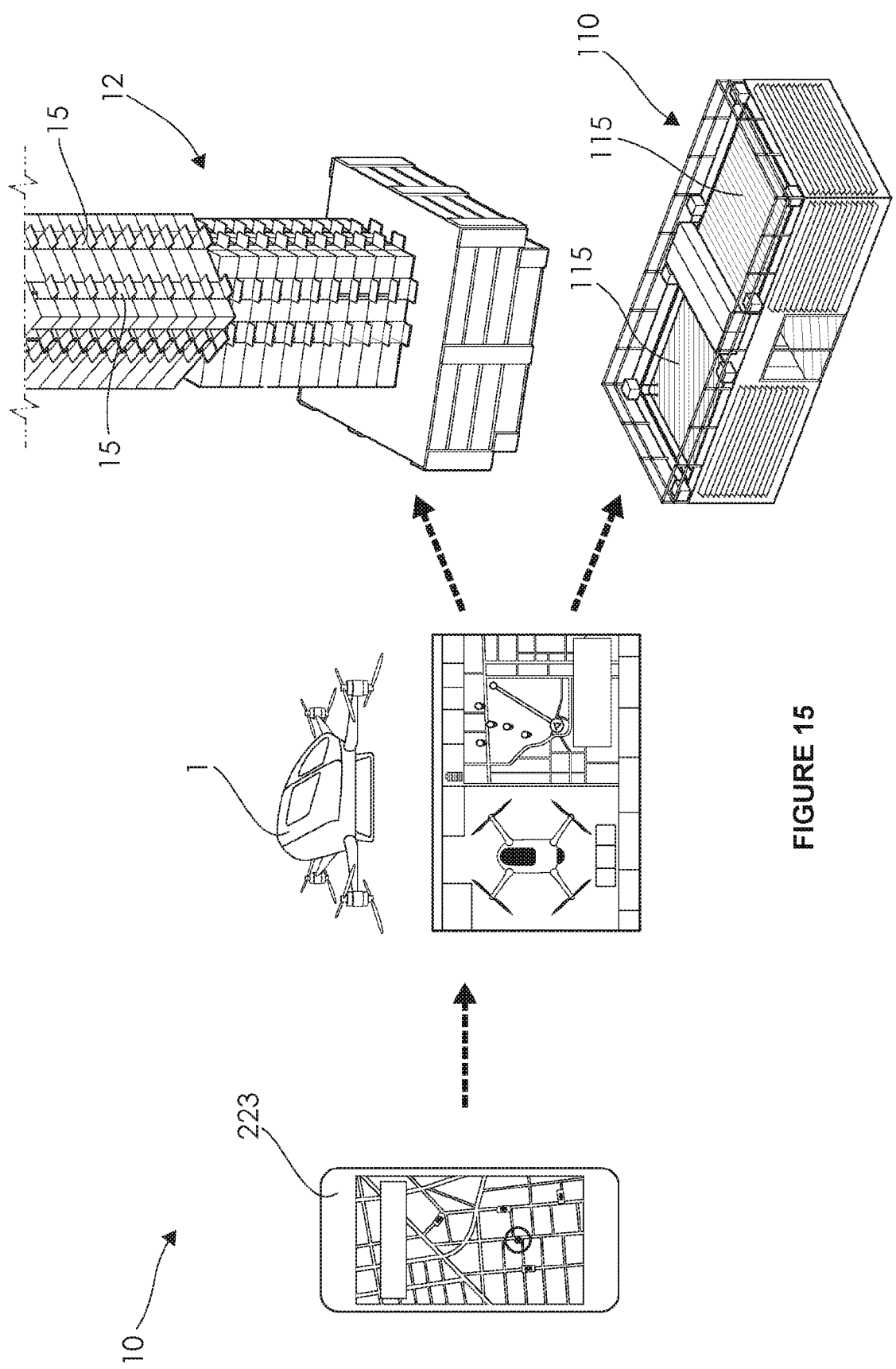
FIG. 15 is a simplified functional diagram illustrating an example of a passenger or freight transport application of the system to call, locate and direct drones.
Figure 16A:
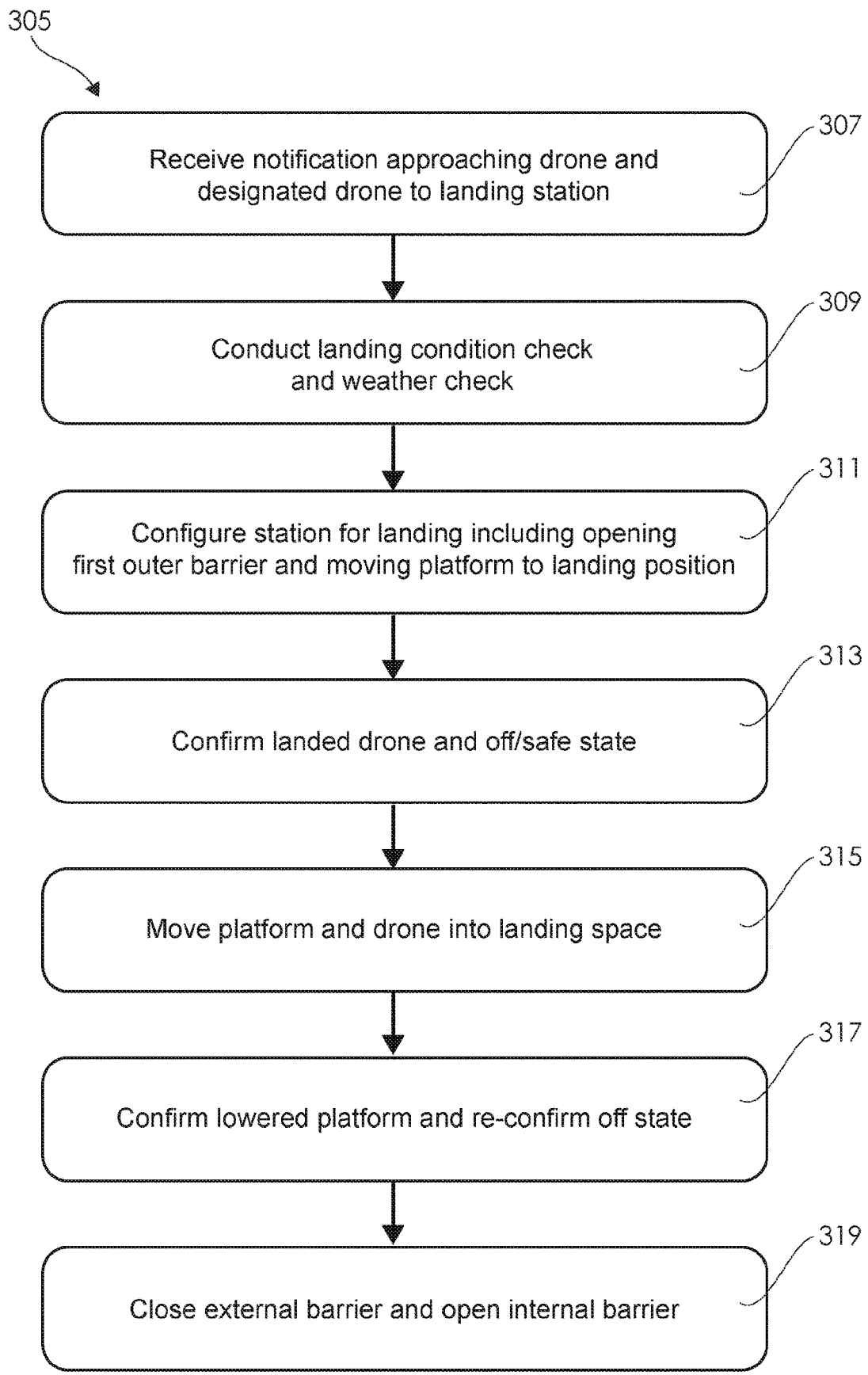
FIGS. 16A and 16B illustrate simplified flow diagrams that show example method steps performed by the system during the landing and take-off of drones.
Figure 16B:
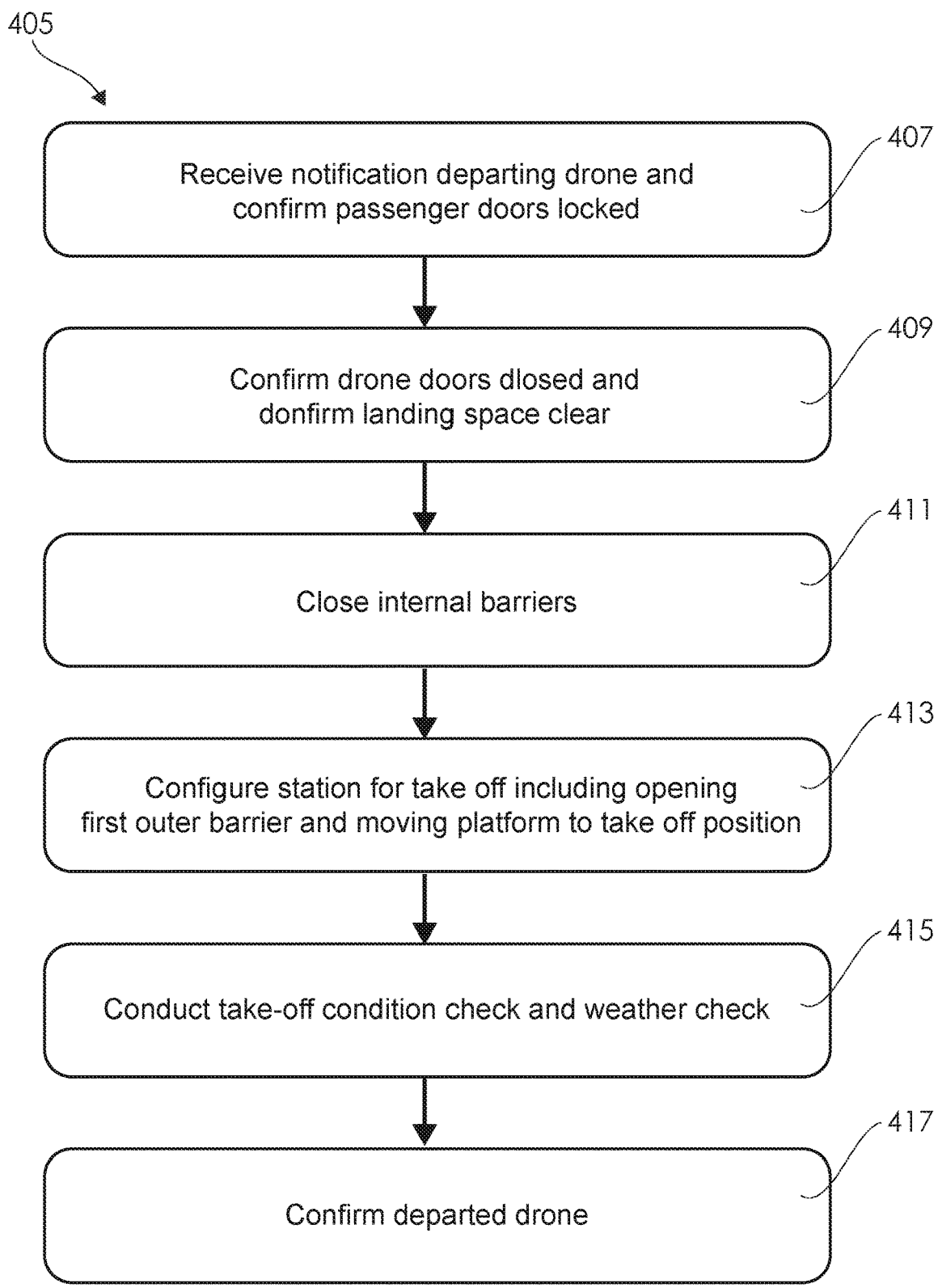

Each example will be described in detail separately below, and like sequences of numerals such as 10, 110 or 12, 112 are used to denote similar parts. However, turning firstly to a general overview of the systems 10, 110, each example includes generally similar functionality and includes drone landing and handling arrangement 13, 113 and a control arrangement or system 205. The control arrangement or system 205 for both building and portable systems 10, 110 is similar and are illustrated in FIGS. 14 and 15 and the methods of operations including example landing and take-off methods 305, 405 are also similar and are illustrated in FIGS. 16A and 16B.

The drone landing and handling arrangement 13, 113 includes one or more landing stations 15, 115. Each landing station 15, 115 includes a landing space, zone or housing 14, 114 dimensioned to receive the drone 1 in a landed state, a motive landing structure provided in the form of a moveable platform 16, 116 movably receivable by the space 14, 114 on which the drone 1 is supportable, a first closable or moveable barrier 17, 117 between an external environment and the drone 1 when landed, and a second closable or moveable barrier 18, 118 into the space 14, 114 dimensioned to selectively allow the movement of a person between the drone 1 and a waiting area or passenger zone 22, 122. The first and second closable barriers 17, 117, 18, 118 may partially or fully enclose the space 14, 114.

It is noted that in some examples the motive landing structure provided in the form of the platform 16, 116 may include a fixed part or structure and a movable part or structure on which the drone 1 is supportable to move the drone 1 into the space 14, 114. The movable part, for example, may include conveying means supported above a fixed platform or the moveable part may be the platform itself as shown in the examples herein. Both examples are contemplated herein.

The control arrangement or system 205 is configured to selectively operate the platform 16, 116, the first closable barrier 17, 117 and second closable barrier 18, 118 between a first condition, in which the first closable barrier 17, 117 is in an open condition, the second closable barrier 18, 118 is in a closed condition and the drone 1 is landable on the platform 16, 116, and a second condition, in which the platform 16, 116 and the landed drone 1 are receivable by the space 14, 114, the first closable barrier 17, 117 is movable to a closed condition, and the second closable barrier 18, 118 is moveable to an open condition.

The control arrangement or system 205 includes a controller 206 that interfaces and operatively communicates with a variety of sensors 207, actuators 209, the drone 1 and external computing devices 223. The controller 206 is configured by software to perform one or more of the steps as described herein such as those in FIGS. 16A and 16B.

The systems 10, 110 disclosed herein seek to provide an effective solution for the safe landing and take-off of passenger or freight hover drones in populated areas. For example, drones 1 may take-off from the portable drone landing station 115 of the portable building 112 in the outer areas of a city or on a building 112 roof top and then fly to the retractable landing platform 16 on the outside of a building 10.

In particular, once the drones 1 have landed and the engines deactivated, the drone 1 is either lowered into the portable drone landing station 115 or horizontally retracted into the building station 12 by the respective drone landing platforms 16, 116. This ensures people waiting to get onto the drone or collect freight are kept safe and separated from the space by the second closable barriers 18, 118 until the landing platform 16, 116 is locked down into the final position.

First Example

Referring now more specifically to FIGS. 1 to 7b, the first example of the system 10 relates to the system 10 fitted to a new or existing building 12 such as a high-rise building or the like. The drone landing and handling arrangement 13 may include a plurality of landing stations 15, a passenger waiting area or zone 22 and maintenance/storage zones 24. The drone handling arrangement 13 may occupy part, a whole floor or multiple floors of the building 12. The control system or arrangement 205 may be located at the building or remote thereto.

Each one of the spaces 14 has an associated one of the platforms 16, one of the first closable barriers 17 and one of the second closable barriers 18. The platforms 16 are supported by a guide arrangement 34 adapted to move the platform 16 between an inward and outward position relative to the space 14. Accordingly, the drone 1 may land on the platform 16 when outwardly extended, and then be carried inwardly within the space 14 when the platform 16 is retracted.

Typically, the exterior retractable platforms 16 of each of the landing stations 15 retracts to a closed position after the drone has landed or before it has taken-off. The exterior retractable platform 16 allows passengers to have safe access and egress to the drone 1 in controlled conditions within the space 14 with minimal weather impacts.

The guide arrangement 34 includes a roller system 33 having a set of side rollers 35 on two sides and these rollers 35 move over extendable tracks 37 that allow it to extend and then retract back into the building 12. Fixed inner wheels 39 inside the tracks 37 are supported by posts 41 that are anchored into the floor plate 59 of the building 12 as shown best in FIG. 5.

Main support beams 53 span across the underside of the landing platform 16 to provide the primary connection to the roller system 33 and support the platform 16 substructure. The substructure then consists of a series of beams 55 that are connected into the main support beams 53 and cantilever out to the end of the platform 16.

The landing platform 16 has safety handrails 51 around all four sides to ensure the safety of the passengers and people maintaining the platform 16. Access to the plant maintenance/storage zones 24 is restricted, and when there is work being undertaken in the landing station 15, the area is shut down and will not allow any drone activity until completed. The handrails 51 provide a safe working platform if maintenance is needed on the platform 16 when external barriers 38 are open. The handrails 51 minimise aerodynamic effect on the drone 1 when landing on the platform 16.

The platform 16 includes an actuator 209 in the form of winches 211 that are used to move the platform 16 inwardly and outwardly. The actuators 209 are controlled by the control system 205. The control system 205 ensures the platform 16 is moved evenly over the roller system by controlling the winch speeds and measuring the distance of the platform from the winches to avoid the rollers jamming.

A sensor arrangement 207 is fitted to each landing station 15. The sensor arrangement 207 may include a sound 217 and a motion sensor 219 placed at each a corner of each landing station 15 to detect any movement or noise as a secondary safety system. This will also detect any object, bird or unauthorised person in the landing area or space, and the control system 205 may be configured to automatically shut down the station 15 such as by locking the second closable barriers 18, until the area is cleared and safe.

The space 14 includes a first opening 36 on an external face of the building 12 that is closable via the first closable barrier 17. The closable barrier 17 is moveable via an actuator 225 that is operable by the control system 205 to allow the landed drone 1 to be received by the space 14 when the platform 16 is retracted. Each space 14 may have its own closable barrier 17. The first closable barrier 17 may be a roller door or the like, or may be retractable bollard posts.

The second closable barrier 18 is arranged to cover an opening 40 of the space 14 to an internal area of building 12, such as the passenger waiting area 22, or the maintenance/storage zones 24. The second closable barrier 18 may be an internal barrier door 42. The door 42 is slidably moveable via an actuator 227 that is operatable by the control system 205 to allow a person to move between the drone 1 within the space 14 and the internal area of building 12, such as the passenger waiting area 22.

The second closable barrier 18, provided here in the form of the internal barrier door 42, is selectively movable by the control system 205 between an open and closed condition depending on the operating state of the drone 1. For example, if the drone is in a safe-state, such as being landed on the platform 16, the platform 16 being retracted and the first closable barrier 17 being in the closed condition, the second closable barrier 18 is moveable to an open condition to allow a passenger to enter and exit the space 14 and drone 1. Each space 14 may have its own second closable barrier 18 or pluralities thereof.

Some examples of the building 12 may include pluralities of the drone handling and landing arrangements 13 on separate floors that each include pluralities of the landing stations 15. In these situations, the use of each of the spaces 14 such as the extension and retraction of the platforms 16 is coordinated by the control system 205 as is further detailed below to prevent, for example, a collision between a drone and one of the platforms 16.

The method of operation of the systems 10, 110 is further detailed below with reference to FIGS. 16A and 16B for take-off and landing operations respectively. At step 307, the control system 205 is notified of an approaching drone and the drone 1 is designated to a particular landing station 15. The control system 205 sends a location signal from a GPS transponder 221 of the platform 16 to the approaching drone 1 such that the drone 1 is able to identify a centre landing position on the platform 16. It is noted that in notifying the drone 1, the control system 205 is also monitoring and coordinating the condition of the other landing stations 15 such as the position of the platforms 16 to avoid, for example, a collision with a higher platform when the drone is landing on a lower platform.

The control system 205 may include a weather unit or station 215 installed at or on the building 12 to measure the wind speed, turbulence, wind shear and other weather conditions that are critical for a drone 1 to land safely on the drone platform 16. Accordingly, at step 309 the control system 205 conducts a landing condition check and weather check.

If the weather conditions are not suitable for a safe landing on the station 15 the drone 1 will be notified in advance so it can make an alternative landing at another landing station or return to the take-off station. If the weather conditions are favourable, the station 15 is configured for landing including the first closable barrier 17 of the designated the landing station 15 being activated to open and the drone landing platform 16 being moved via the winches 211 to an outward landing position extending outside of the building 12. The drone 1 then lands on the platform 16. It is noted that the landing condition check and weather check may further include a safety check using the sensors 207 to confirm the platform 16 is free for use and clear of obstacles.

After the drone 1 has landed onto the platform 16, and the rotors of the drone 1 have stopped, the drone 1 may notify the control system 205 that it is not in operation. Accordingly, at step 313, the control system 205 receives a landed signal from the drone 1 and performs its own cross check to confirm an off-state or "safe-state" of the drone. The control system sensors 207 that may include sound 217 and/or motion sensors 219 on each corner of the landing platform 16 also check that all the rotors have stopped and it is safe to retract the drone platform 16 into the building 10.

At step 315, the control system 215 then moves the platform 16 and landing drone 1 into the landing space 14, The electric winches 211 pull the landing platform 16 into the building via wire ropes 56 connected to the platform 16. The control system 205 checks that each winch 211 is fully operational, before activating them to pull in the platform simultaneously. The control system 205 then controls the winch speeds and progress of the platform 16. The force on each of the wire ropes 56 are measured with load gauges to inform the control system 205 of any out of balance load and the winch speeds are balanced accordingly to ensure a safe passage of the platform into the space 14 of the landing station 15.

At step 317, the control system 205 confirms that the platform 16 is within the building 12 and re-confirms the off-state or "safe-state" using the sensors 207. For example, as a secondary precaution, further motion sensors 217 may also be installed in each corner of the landing station 15 to ensure that the drone 1 is not operational before allowing the second closable barrier 18 provided in the form of the internal barrier doors 42 to open. An unsafe state may include, for example, the rotors still moving.

At step 319, once the landing platform is locked into position within the building 12, a signal is sent from the floor lock sensors so the exterior retractable barrier 38 can be closed. When the external barrier 38 is locked in position, the internal barrier doors 42 can open. The waiting area 22 inside the building 12 allows people to wait in a safe environment until the drone 1 arrives. The secure plant and maintenance room 24 may have tools and equipment for general maintenance of the landing station and minor repairs as needed, as well as electric battery recharge and change over stations.

For drone take-off, the reverse process similar to that described above for a drone landing is followed for a passenger boarding a drone to take-off or for freight to be transported from the drone landing station 15. Accordingly, referring to FIG. 16B, at step 407, the control system 205 may receive a signal indicating a departing drone and confirm, in the case of a passenger drone, that the passenger drones doors locked.

At step 409, when a passenger has boarded the drone and the doors of the drone are closed, the control system 205 may confirm via the motion sensors 219 within the landing station 15 to ensure there is no movement in the landing space 14 before the internal barrier 18 is closed, at step 411. When freight has been dropped off for a freight carrier drone, the same applies that when no one is present in the landing space 14 the internal barrier 18 are closed and secured.

A step 413, the station 15 is configured for take-off including opening the first barrier 17 and moving or extending the platform 16 to the landing position of platform 16. For the drone to take-off from the drone platform 15, at step 415 the control system 205 performs a check with the weather station 215 to ensure the weather conditions are suitable. If there are sudden wind gusts or weather parameters that are not suitable, the drone landing platform 16 may be retraced and the first barrier 17 may be closed until it is deemed safe to resume. At step 417, the control system 205 provides the drone with a confirmation signal to begin operation and the drone proceeds to take-off. The control system 205 may again used the sensors 207 to confirm the take-off of the drone and the drone may also send a departed confirmation signal to the control system 205.

The drone landing station 15 may allow people or freight to be delivered safely into major hubs that integrate residential, retail and commercial developments together. The drone landing stations can be adapted to any new or existing building that has sufficient vertical clearance between the floor plates and horizontal clearance between the external columns for the retractable drone landing platform and door systems to be installed. In a new development or the refurbishment of an existing building, this could provide affordable housing apartments on the opposite side of the drone landing stations 15.

Second Example

The first example of the system 110 includes a portable building or station structure 112 in which the drone landing and handling arrangement 113 is configured to enable landing of the drone via the roof 150 of the portable building structure 112. In this example, the drone landing and handling arrangement 113 includes two landing stations 115.

Each landing station 115 includes a landing space or zone 114, an associated one of the platforms 116, the first closable barrier 117 and the second closable barrier 118. In this example, the first closable barriers 117 is provided in the form of a retractable roof barrier 138 and the second closable barrier 118 includes internal passenger barriers 142 such as sliding doors. Between the two landing stations 115 is provided a passenger waiting area or zone 122 and a maintenance or storage area of zone 124. However, it is noted that in some examples the first closable barriers 117 may be omitted as the platforms 116 may be configured to close the roof 150 when elevated.

In this example, the platforms 116 move vertically between a first landing position proximate the roof 150 to a second lowered position within the space 114. Like the first example, the control system 205 coordinates and controls the movement of the retractable roof barrier 138, platform 116 and internal passenger barriers 142.

The overall method of operation is similar to the first example, however, of course, the platform 116 raises and lowers in this second example. Accordingly, methods 305, 405 also generally apply to this example aside from the vertical movement of the platform 116, and the method steps are not again repeated here in detail for brevities sake.

Accordingly, in general terms, in this example, the exterior retractable roof barrier 138 is activated by the control system 205 to open when the designated drone 1 approaches. Each landing platform 116 sends the GPS transponder signal to the approaching drone 1 of where to land on the platform 16 so it is positioned in the centre.

The exterior retractable roof barrier 138 provides a secure barrier to prevent people or animals coming down into the station 115 and allows people to access and egress the drone 1 in controlled conditions within the landing station 115 without exposure to weather impacts (rain, hail, etc.)

Like the first example, a weather station 215 is installed on the top of the portable building 112 to measure the wind speed, turbulence, wind shear and other weather conditions that are critical for a drone to land safely. If the weather conditions are not suitable for a safe landing on the station the drone will be notified in advance so it can make an alternative landing at another landing station or return to the take-off station.

If the weather conditions are favourable, the roof barrier 138 is retracted and the drone landing platform 116 is moved upward to the roof position. The building 112 includes actuators 209 in the form of electric winches 211 at each of the four corners of each landing station 115 that form part of an elevation arrangement 170.

The elevation arrangement 170 further includes a wire rope and pulley system 172 that is coupled to the electric winches 211 to lift and lower the landing platform up and down to the roof 150. The control system 205 in the plant room checks that each winch 211 is fully operational, before activating them to lift-up the platform simultaneously. A levelling device may be placed on the platform 116 and notifies the control system if the platform 116 is not horizontal. The control system 205 then controls the winch speeds and progress of each corner to ensure the platform 116 is stable and horizontal. The force on each of the four wire ropes are measured with load gauges to inform the control system 205 of any out of balance load and the winch speeds are balanced accordingly to ensure a safe decent of the platform.

The roof top 150 of the building 116 includes safety handrails 151 around all four sides to ensure the safety of the maintainers on the roof of the station 115. Access to the roof 150 is only via the plant maintenance room 124, and when the roof access hatch is open the station 115 is automatically shut down by the control system 205 (such as by a hatch sensor) and will not allow any drone activity until completed. Motion sensors 219 and/or sound sensors 217 are also placed at each corner of the landing station roof 150 to detect any movement as a secondary safety system. This will also detect any animal or unauthorised person on the roof 150 and will automatically shut down the station until the area is cleared and safe.

After the drone 1 has landed onto the platform 116, and the rotors have stopped, the drone 1 send a signal to the control system 205 that it is not in operation. The motion sensors 219 and/or sound sensors 217 on each corner of each landing platform also check that all the rotors have stopped and it is safe to lower the drone 1 platform 16 to the lowered floor position.

The control system 205 then coordinates the operation of the electric winches 211 at each of the four corners of the landing station floor, and then lowers the landing platform 116 from the roof level to the floor level via the wire rope and pulley system 172. The control system 205 may be configured to check that each winch 211 is fully operational, before activating them to lift-up the platform 116 simultaneously.

Once the landing platform 116 is locked into the floor position, a signal is sent from the floor lock sensors so the two electric powered roof winches can pull out close the external roof barrier 138 to cover the landing platform 116 and space 114. When the roof barrier 138 is locked in position, the internal passenger barriers 142 may open. As a secondary precaution, further sensors 207 such as motion sensors may be installed in each corner of the landing station 115 to ensure that the drone 1 is not operational before allowing the internal passenger barriers 142 to open.

The waiting area or zone 122 inside the portable building 112 allows people to be sheltered from the weather until the drone 1 arrives. The drones 1 could be ordered from an external computing device 223 such as a smartphone and be allocated to the user, like organising a car pickup from a ride sharing application, such as is shown in FIG. 15. The secure plant and maintenance room 124 may have tools and equipment for general maintenance of the landing station and minor repairs as needed as well, as electric battery recharge and change over stations.

The landing zones or space 114 within the station 115 may be designed with natural ventilation louvres 161 around the sides to reduce the need for air-conditioning. Rain that falls into the landing zones 114 during take-off and landing would be discharged outside the building with a simple drainage system at floor level. For drone take-off, the reverse process to that described above for a drone landing is followed for a passenger boarding a drone to take-off or for freight to be transported from the drone landing station. When a passenger has boarded the drone and the doors are closed a signal is sent to the control system 205 that the passenger safety doors 142 can close. The motion sensors 219 within the landing station 115 ensure there is no movement in the landing area before the Passenger Safety Doors are closed. When freight has been dropped off for a freight carrier drone, the same applies that when no-one is present in the landing platform 116 area the passenger safety doors are closed and secured.

For the drone to take-off from the elevated drone platform 116, a final check is undertaken with the weather station 215 to ensure the weather conditions are suitable. If there are sudden wind gusts or weather parameters that are not suitable, the drone landing platform will be lowered into position and the roof barrier 138 is closed until it is deemed safe to resume.

The portable building 112 including the landing stations 115 are envisaged to be cost effectively built and commissioned in factory conditions to allow mass production. The dimensions of the stations will be appropriate to the size of the passenger or freight drone being used. Larger stations can be transported on road or rail transport to the populated areas and lifted off by crane. For smaller stations or in difficult to access areas, the stations could be transported and lowered from a helicopter or large drone.

The portable building 112 may be positioned as frequently as needed to suit the demand and popular drone flight routes. Low voltage power supply would be needed at each station to operate the exterior retractable roof doors, interior safety doors and lighting. Solar roof panels/solar windows can be used to provide all/some of the power requirements.

The portable building 112 is preferably made of lightweight materials such as aluminium, to reduce weight for air transport if needed and this would reduce the whole of life operations and maintenance requirements. The portable building 112 would be preferably secured to the ground from wind loads with screw anchors or similar systems. Alternatively, concrete footings or above ground mass concrete support blocks could also be used.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any known matter or any prior publication is not, and should not be taken to be, an acknowledgment or admission or suggestion that the known matter or prior art publication forms part of the common general knowledge in the field to which this specification relates.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

The claims defining the invention are as follows:

1. A drone landing system, the drone landing system including:
   a moveable platform on which the drone is supportable in a landed state;
   a space dimensioned to receive the platform and the drone in the landed state;
   a first closable barrier arrangeable between the drone in the landed state and an external environment when the platform and the drone are received by the space;
   a second closable barrier arrangeable between the drone in the landed state and a personnel zone adjacent the space so as to inhibit access of a person between the drone and the personnel zone; and
   a control arrangement configured to determine an operating state of the drone being in one of a safe state in which at least one of a drone body and rotors of the drone cease movement and a non-safe state, and in the safe state selectively operate the platform to carry the drone into the space such that the platform, the first closable barrier, and the second closable barrier are operated between:
   a first condition, in which the drone is landable on the platform and at least one of the first closable barrier and the second closable barrier are in a closed condition between the drone and at least one of the space and personnel zone, and
   a second condition, in which the platform and the drone in the landed state are receivable by the space, the first closable barrier is movable to the closed condition, and the second closable barrier is moveable to an open condition so as to allow access of the person between the drone and the personnel zone,
   wherein the platform is adapted to carry the drone into the space when being moved between the first condition and the second condition.

2. The drone landing system according to claim 1, wherein the control arrangement is adapted to determine the operating state of the drone in the second condition being in one of the safe and the non-safe state, and inhibit operation of the second closable barrier in the non-safe state.

3. The drone landing system according to claim 1, wherein the control arrangement is adapted to determine the operating state of the drone in the first condition being in one of the safe and the non-safe state, and inhibit movement of the platform to within the space in a non-safe state.

4. The drone landing system according to claim 2, wherein the control arrangement includes at least one of a sensor and a communication link with the drone to determine the operating state of the drone.

5. The drone landing system according to claim 2, wherein the platform includes at least one sensor adapted to provide information to enable the control arrangement to determine the operating state of the drone.

6. The drone landing system according to claim 1, wherein the control arrangement is adapted identify an approaching drone, and move the platform, the first closable barrier and the second closable barrier to the first condition.

7. The drone landing system according to claim 1, wherein in the second condition, the control arrangement is configured to move the first closable barrier to the closed condition.

8. The drone landing system according to claim 1, wherein the system includes:
   a first opening between the external environment and the space, and wherein the first closable barrier is located at the first opening; and
   a second opening between the space and the personnel zone, and wherein the second closable barrier is located at the second opening.

9. The drone landing system according to claim 8, wherein the first and second closable barriers are arranged to substantially cover the respective first and second openings of the space in respective closed conditions.

10. A drone landing system, the drone landing system including: a moveable platform on which the drone is supportable in a landed state; a space dimensioned to receive the platform and the drone in the landed state, a first closable barrier arranged between the drone in the landed state and an external environment when the platform and the drone are received by the space; a second closable barrier arranged between the drone in the landed state and a personnel zone adjacent the space; and a control arrangement configured to determine an operating state of the drone being in one of a safe state in which at least one of a drone body and rotors of the drone cease movement and a non-safe state, and in the safe state selectively operate the platform to carry the drone into the space such that the platform, the first closable barrier and the second closable barrier are operated between: a first condition, in which the first closable barrier is in an open condition so that the drone is landable on the platform the second closable barrier is in a closed condition so as to prevent access of a person between the platform and the drone in the landed state received by the space and the personnel zone, and a second condition, in which the platform and the drone in the landed state are receivable by the space, the first closable barrier is movable to a closed condition, and the second closable barrier is moveable to an open condition so as to allow access of the person between the drone and the personnel zone.

11. The drone landing system according to claim 1, wherein the system includes pluralities of spaces, first and second closable barriers and platforms, and wherein the control arrangement is configured to coordinate the movement of the pluralities of the first and second closable barriers and the platforms so as to allow operation of pluralities of drones to each of the pluralities of the spaces.

12. The drone landing system according to claim 1, wherein the platform is adapted to convey the drone into the space when being moved between the first condition and the second condition.

13. The drone landing system according to claim 1, wherein the platform is adapted to extend and retract relative to the space when being moved between the first condition and the second condition.

14. The drone landing system according to claim 1, wherein the platform is adapted to move upwardly and downwardly relative to the space when being moved between the first condition and the second condition.

15. The drone landing system according to claim 1, wherein the personnel zone is at least partially enclosed.

16. The drone landing system according to claim 1, wherein the platform at least one of carries and provides the first closable barrier.

17. The drone landing system according to claim 1, wherein the drone is a passenger or freight drone.

18. A drone landing station, the drone landing station including:
   a space dimensioned to receive the drone;
   a landing platform movably receivable by the space on which the drone is supportable;
   a first closable barrier between an external environment and the space when the platform and the drone are received by the space;
   a second closable barrier between the space and a personnel zone adjacent the space so as to inhibit access of a person between the drone received by the space and the personnel zone; and
   a control system configured to determine an operating state of the drone being in one of a safe state in which at least one of a drone body and rotors of the drone cease movement and a non-safe state, and in the safe state selectively operate the platform to carry the drone into the space such that the platform, the first closable barrier, and the second closable barrier are operated between a first condition, in which the drone is landable on the platform and at least one of the first and second closable barriers is in a closed condition between the drone and at least one of the space and personnel zone, and a second condition, in which the platform and the landed drone are receivable by the space, the first closable barrier is movable to a closed condition, and the second closable barrier is moveable to an open condition so as to allow access of the person between the drone and the personnel zone,
   wherein the platform is adapted to carry the drone into the space when being moved between the first condition and the second condition.

19. The drone landing system of claim 10, wherein the second closable barrier is located at an opening between the space and the personnel zone and configured to substantially cover the opening so as to prevent access of the person between the drone received by the space and the personnel zone.

20. The drone landing system of claim 9, wherein the first closable barrier and the second closable barrier enclose the space when arranged in the respective closed positions.

* * * * *